United States Patent
Hahn et al.

(10) Patent No.: US 12,531,604 B2
(45) Date of Patent: Jan. 20, 2026

(54) METHOD AND DEVICE FOR TRANSMITTING AND RECEIVING SIGNALS IN COMMUNICATION SYSTEM

(71) Applicants: HYUNDAI MOTOR COMPANY, Seoul (KR); KIA CORPORATION, Seoul (KR); SEOUL NATIONAL UNIVERSITY R&DB FOUNDATION, Seoul (KR)

(72) Inventors: Gene Back Hahn, Hwaseong-si (KR); Young Kil Suh, Hwaseong-si (KR); Ui Hyun Hong, Hwaseong-si (KR); Bum Jun Kim, Seoul (KR); Jeonghyeon Kwon, Seoul (KR); Wan Choi, Seoul (KR)

(73) Assignees: Hyundai Motor Company, Seoul (KR); Kia Corporation, Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 7 days.

(21) Appl. No.: 18/640,969

(22) Filed: Apr. 19, 2024

(65) Prior Publication Data
US 2024/0267092 A1  Aug. 8, 2024

Related U.S. Application Data

(63) Continuation-in-part of application No. PCT/KR2022/018138, filed on Nov. 16, 2022.

(30) Foreign Application Priority Data

Nov. 16, 2021 (KR) ........................ 10-2021-0157966

(51) Int. Cl.
*H04B 7/0413* (2017.01)
*H01Q 15/02* (2006.01)
*H04B 7/06* (2006.01)

(52) U.S. Cl.
CPC ........... *H04B 7/0413* (2013.01); *H01Q 15/02* (2013.01); *H04B 7/0691* (2013.01)

(58) Field of Classification Search
CPC ..... H04B 7/0691; H04B 7/0413; H01Q 15/02
See application file for complete search history.

(56) References Cited

U.S. PATENT DOCUMENTS 9,444,139 B2  9/2016  Montgomery et al.
10,256,551 B2  4/2019  Shehan
(Continued)

FOREIGN PATENT DOCUMENTS

KR  10-2019-0118794 A  10/2019

OTHER PUBLICATIONS

International Search Report dated Mar. 8, 2023 cited in International Patent Application No. PCT/KR2022/018138 (w/English translation).
(Continued)

*Primary Examiner* — Rahel Guarino
(74) *Attorney, Agent, or Firm* — Morgan Lewis & Bockius LLP

(57) ABSTRACT

A method for operating a first communication node in a communication system includes the steps of: receiving a first command from a second communication node; identifying reference frequency information for determining, on the basis of the received first command, a lens to be applied to a first antenna that is included in the first communication node and includes a plurality of antenna elements; receiving first scheduling information indicating that a first signal is to be transmitted to the first communication node; determining, on the basis of the first scheduling information, a first frequency at which the first signal is transmitted; determining a first lens on the basis of the reference frequency information and the first frequency; and receiving a first
(Continued)

signal incident on at least some of the plurality of antenna elements after being refracted from the first antenna through the first lens.

15 Claims, 9 Drawing Sheets

(56) References Cited

U.S. PATENT DOCUMENTS 10,931,029 B2 2/2021 Ko et al.
2022/0407238 A1* 12/2022 Horn .................... H01Q 25/008

OTHER PUBLICATIONS

Y. Zeng, et al., "Millimeter Wave MIMO with Lens Antenna Array: A New Path Division Multiplexig Paradigm," arXiv:1507.01699v1, Jul. 7, 2025, pp. 1-16.
Y. J. Cho, et al., "RF Lens-Embedded Antenna Array for mmWave MIMO: Design and Performance," arXiv:1801.07167v1, Jan. 22, 2018, pp. 1-8.
Physical Channels and Modulation (Release 16), 3rd Generation Partnership Project; Technical Specification Group Radio Access Network; NR; 3GPP TS 38.211 V16.7.0 (Sep. 2021).
Physical Layer Procedures for Data (Release 16), 3rd Generation Partnership Project; Technical Specification Group Radio Access Network; NR; 3GPP TS 38.214 V16.7.0 (Sep. 2021).

* cited by examiner

METHOD AND DEVICE FOR TRANSMITTING AND RECEIVING SIGNALS IN COMMUNICATION SYSTEM

CROSS-REFERENCE TO RELATED APPLICATION

The present application is a continuation-in-part of currently pending International Patent Application No. PCT/KR2022/018138, filed Nov. 16, 2022, which claims priority to Korean Patent Application Number 10-2021-0157966, filed Nov. 16, 2021, the entire contents of which are incorporated herein for all purposes by these references.

BACKGROUND OF THE PRESENT DISCLOSURE

Field of the Present Disclosure

The present disclosure relates to a signal transmission and reception technique in a communication system, and more particularly, to a signal transmission and reception technique for improving multi-input multi-output (MIMO)-based communication performance in a high frequency band.

Description of Related Art

With the development of information and communication technology, various wireless communication technologies are being developed. Representative wireless communication technologies include long-term evolution (LTE) and new radio (NR) defined as the 3rd generation partnership project (3GPP) standards. The LTE may be one of the 4th generation (4G) wireless communication technologies, and the NR may be one of the 5th generation (5G) wireless communication technologies.

In order to process rapidly increasing wireless data, the 5G NR communication or subsequent wireless communication technologies can support communication in relatively high frequency bands. For example, radio frequency bands used for wireless communication may be broadly classified into frequency range 1 (FR1) bands and frequency range 2 (FR2) bands. Here, the FR1 bands may refer to relatively low frequency bands of about 7 GHz or below. The FR2 bands may refer to relatively high frequency bands of about 7 GHz or above.

In a relatively high frequency band such as a 24-53 GHz band corresponding to the FR2 band, an unlicensed band, and a millimeter wave band, a path loss may occur at a relatively high level. In an exemplary embodiment of a communication system using a high frequency band, the path loss problem may be solved by using a large number of antennas to transmit and receive a wireless signal (or beam) with high antenna gain.

In an ultra-high frequency band such as a terahertz wave band, a very large number of antennas may need to be used to improve communication quality. As the number of antennas used for communication increases, the overhead and/or the amount of calculation required for communication may increase. Techniques for improving efficiency in transmitting and receiving wireless signals using a large number of antennas may be required in a relatively high frequency band.

The information disclosed in this Background of the Invention section is only for enhancement of understanding of the general background of the invention and may not be taken as an acknowledgement or any form of suggestion that this information forms the related art already known to a person skilled in the art.

BRIEF SUMMARY

The present disclosure for achieving the abode-described objective is directed to providing a method and an apparatus for transmitting and receiving signals, which improve performance of MIMO-based communication in which a radio signal is transmitted using a large number of antennas in a high frequency band.

An operation method of a first communication node, according to an exemplary embodiment of the present disclosure for achieving the above-described objective, may include: receiving a first indication from a second communication node in the communication system; based on the received first indication, identifying reference frequency information for determining a lens to be applied to a first antenna included in the first communication node and including a plurality of antenna elements; receiving first scheduling information indicating that a first signal is to be transmitted to the first communication node; based on the first scheduling information, identifying a first frequency at which the first signal is to be transmitted; based on the reference frequency information and the first frequency, determining a first lens applied to the first antenna for reception of the first signal; and receiving the first signal incident on at least part of the plurality of antenna elements of the first antenna after being refracted at the first lens.

The first indication may include reference lens information corresponding to the reference frequency information, and the determining of the first lens may include: identifying a first reference frequency corresponding to the first frequency from the reference frequency information; identifying the first lens corresponding to the first reference frequency from the reference lens information; and applying the first lens to the first antenna.

The determining of the first lens may include: identifying a first reference frequency corresponding to the first frequency from the reference frequency information; identifying the first lens corresponding to the first reference frequency from reference lens information, the reference lens information being configured in the first communication node as corresponding to the reference frequency information; and applying the first lens to the first antenna.

The identifying of the reference frequency information may include: identifying a plurality of reference frequencies included in the reference frequency information; identifying information on a spacing between the plurality of antenna elements of the first antenna; and configuring the reference lens information including information on a plurality of lenses suitable for reception of wireless signals at the plurality of reference frequencies, based on wavelengths corresponding to the respective plurality of reference frequencies and information on the spacing between the plurality of antenna elements.

The receiving of the first signal may include: identifying information on received strengths of the first signal at the respective plurality of antenna elements through primary sensing; and based on the identified information on the received strengths, determining a candidate antenna group that satisfies a first condition from the plurality of antenna elements.

The identifying of the information on the received strengths of the first signal may include: activating one or more antenna elements for each of a plurality of antenna groups each composed of a plurality of antenna elements; detecting a received strength of the first signal through each of one or more antenna elements activated for each of the plurality of antenna groups; and based on the received strengths of the first signal detected through the respective activated one or more antenna elements, estimating received strengths of the first signal at all antenna elements included in the respective plurality of antenna groups.

The receiving of the first signal may include: determining whether to perform the primary sensing again based on a number of antenna elements included in the candidate antenna group; generating a re-sensing indicator indicating whether to perform the primary sensing again; and transmitting the re-sensing indicator to the second communication node.

The determining of the candidate antenna group may include: comparing the received strength of the first signal at each of the plurality of antenna elements with a first threshold; and determining one or more antenna elements at which received strengths of the first signal are greater than or equal to the first threshold as the candidate antenna group.

The operation method may further include: after receiving the first signal, identifying a candidate antenna group determined based on primary sensing on the first signal; performing secondary sensing on a second signal transmitted to the first communication node to identify information a received strength at each candidate antenna element included in the identified candidate antenna group; determining a final antenna group that satisfies a second condition from the candidate antenna elements, based on the information on the received strength at each of the candidate antenna elements; identifying information on an angle of arrival (AoA) at one or more antenna elements included in the final antenna group; and based on the identified information on the AoA, estimating an AoA of the second signal at the first antenna.

The determining of the final antenna group may include: comparing the received strength of the second signal at each of the candidate antenna elements with a second threshold; and determining one or more antenna elements at which received strengths of the second signal is greater than or equal to the second threshold as the final antenna group.

The estimating of the angle of arrival may include: when the final antenna group includes a plurality of antenna elements, estimating that each of AoAs at the plurality of antenna elements included in the final antenna group corresponds to an AoA of each of multiple paths through which the second signal is received.

An operation method of a first communication node, according to another exemplary embodiment of the present disclosure for achieving the above-described objective, may include: transmitting, to a second communication node in the communication system, a first indicating including reference frequency information and reference lens information for determining a lens to be applied to a first antenna included in the second communication node and including a plurality of antenna elements; transmitting, to the second communication node, first scheduling information for a first signal, which is configured based on a first reference frequency among one or more reference frequencies indicated by the reference frequency information included in the first indication; and based on the first scheduling information, transmitting the first signal to the second communication node, wherein the first signal is received at the first antenna through a first lens corresponding to the first reference frequency based on the reference lens information.

The operation method may further include: after transmitting the first indication, transmitting information on a first condition to the second communication node, wherein the first condition is used to determine a candidate antenna group from the plurality of antenna elements included in the first antenna through sensing on a wireless signal received by the second communication node.

The operation method may further include: after transmitting the first signal, receiving, from the second communication node, a re-sensing indicator generated according to a candidate antenna group determined based on a result of primary sensing on the first signal and the first condition; and determining whether the second communication node is to perform the primary sensing again based on the re-sensing indicator.

The operation method may further include: after transmitting the first indication, transmitting information on a second condition to the second communication node, wherein the second condition is used to determine a final antenna group for AoA estimation of a wireless signal from the plurality of antenna elements included in the first antenna through sensing on the wireless signal received by the second communication node.

Using the signal transmission and reception methods and apparatuses according to the exemplary embodiments of the present disclosure, MIMO-based communication performance for transmitting and receiving wireless signals using a large number of antennas in a high frequency band can be improved. A communication node can easily respond even when there is a large variation in a frequency used for wireless communication by variably applying a lens without changing an arrangement structure of antenna elements constituting a MIMO antenna. The communication node can easily estimate an angle of arrival of the wireless signal incident on the antenna elements of the MIMO antenna through the lens.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
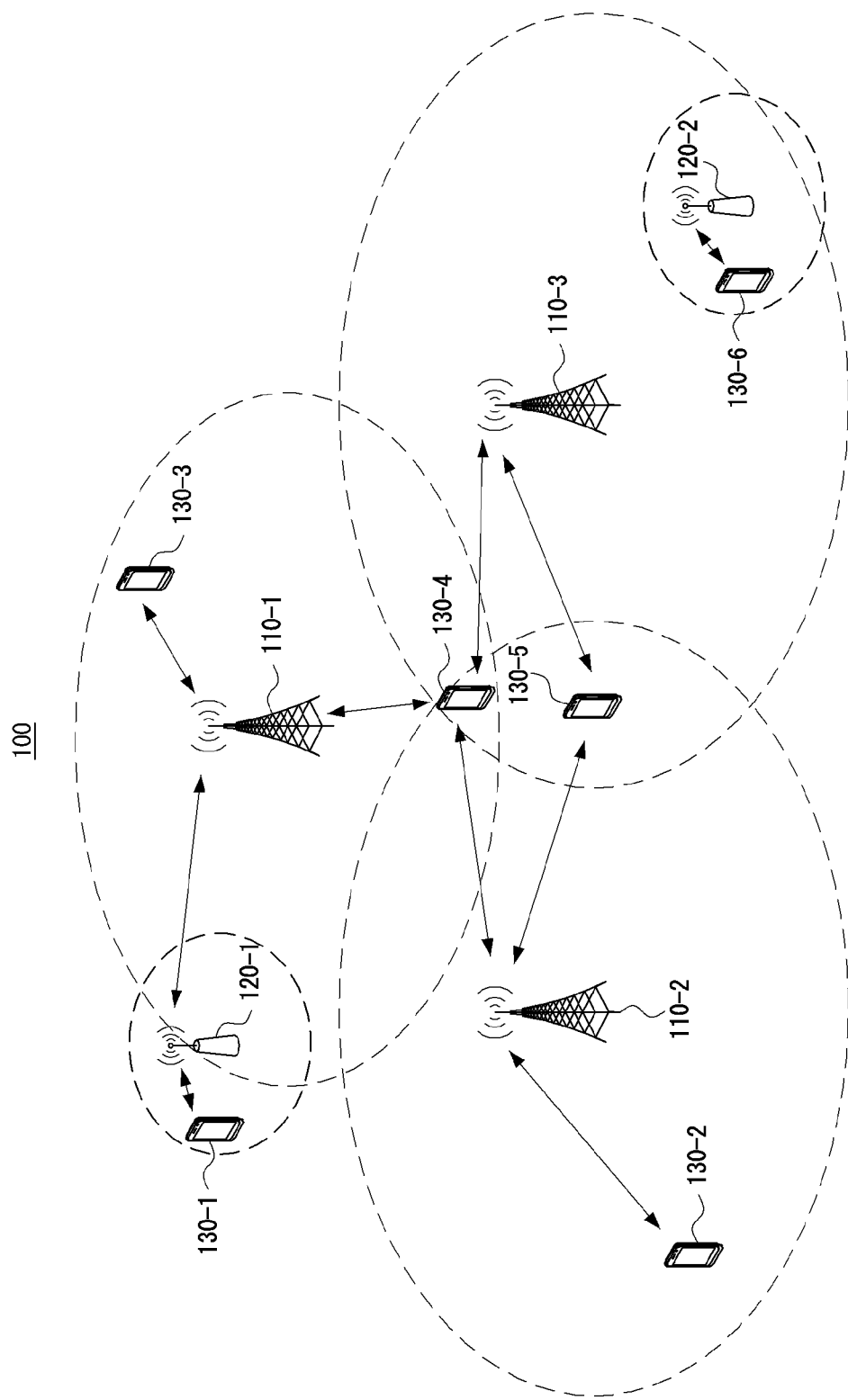
FIG. 1 is a conceptual diagram illustrating an exemplary embodiment of a communication system.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the contrary, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a Global System for Mobile communication (GSM) or a Code Division Multiple Access (CDMA), 3G mobile communication network such as a Wideband Code Division Multiple Access (WCDMA) or a CDMA2000, 3.5G mobile communication network such as a High Speed Downlink Packet Access (HSDPA) or a High Speed Uplink Packet Access (HSUPA), 4G mobile communication network such as a Long Term Evolution (LTE) network or an LTE-Advanced network, 5G mobile communication network, B5G mobile communication network (6G communication network, etc.), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present disclosure, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

As shown in FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g. a serving gateway (S-GW), a packet data network (PDN) gateway (P-GW), and a mobility management entity (MME)). When the communication system 100 is a 5G communication system (e.g. New Radio (NR) system), the core network may include an access and mobility management function (AMF), a user plane function (UPF), a session management function (SMF), and the like.

The plurality of communication nodes 110-1, 110-2, 110-3, 120-1, 120-2, 130-1, 130-2, 130-3, 130-4, 130-5, and 130-6 may support communication protocols defined in the 3rd generation partnership project (3GPP) technical specifications (e.g. LTE communication protocol, LTE-A communication protocol, NR communication protocol, or the like). The plurality of communication nodes 110-1, 110-2, 110-3, 120-1, 120-2, 130-1, 130-2, 130-3, 130-4, 130-5, and 130-6 may support Code Division Multiple Access (CDMA) based communication protocol, Wideband CDMA (WCDMA) based communication protocol, Time Division Multiple Access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
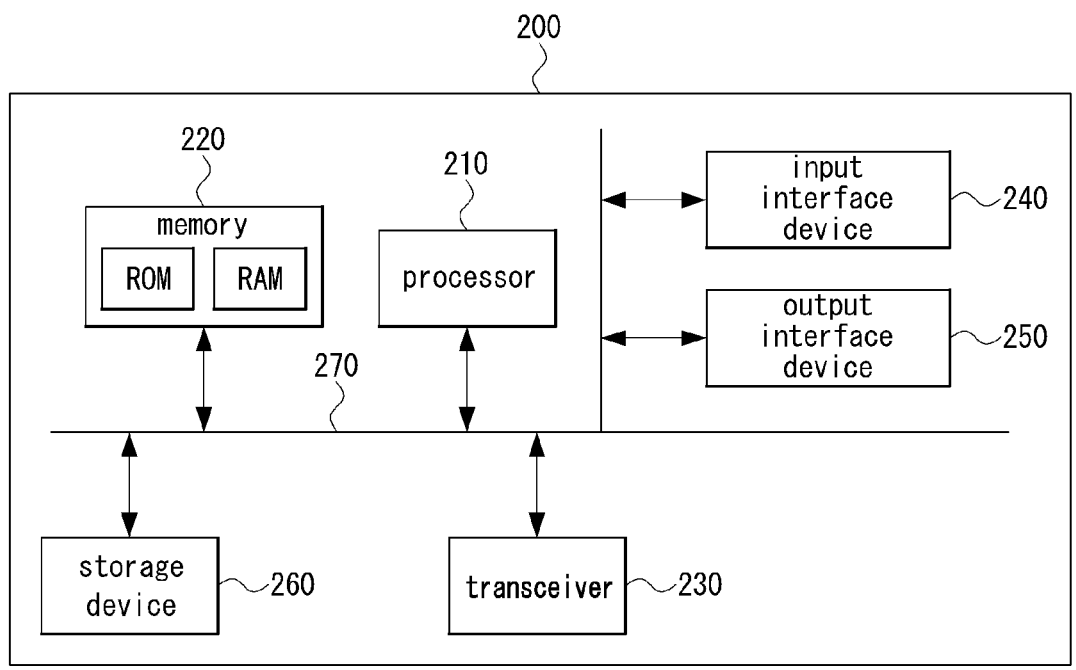
FIG. 2 is a block diagram illustrating an exemplary embodiment of a communication node constituting a communication system.

FIG. 2 is a block diagram illustrating an exemplary embodiment of a communication node constituting a communication system.

As shown in FIG. 2, an apparatus 200 may comprise at least one processor 210, a memory 220, and a transceiver 230 connected to the network for performing communications. Also, the apparatus 200 may further comprise an input interface device 240, an output interface device 250, a storage device 260, and the like. The respective components included in the apparatus 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (CNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g. single-user MIMO (SU-MIMO), multi-user MIMO (MU-MIMO), massive MIMO, or the like), a coordinated multipoint (COMP)

transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to operations of the plurality of base stations 110-1, 110-2, 110-3, 120-1, and 120-2, operations supported by the plurality of base stations 110-1, 110-2, 110-3, 120-1, and 120-2, or the like. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the COMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, signal transmission and reception methods in a communication system will be described. Even when a method (e.g. transmission or reception of a data packet) performed at a first communication node among communication nodes is described, the corresponding second communication node may perform a method (e.g. reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

Figure 3:
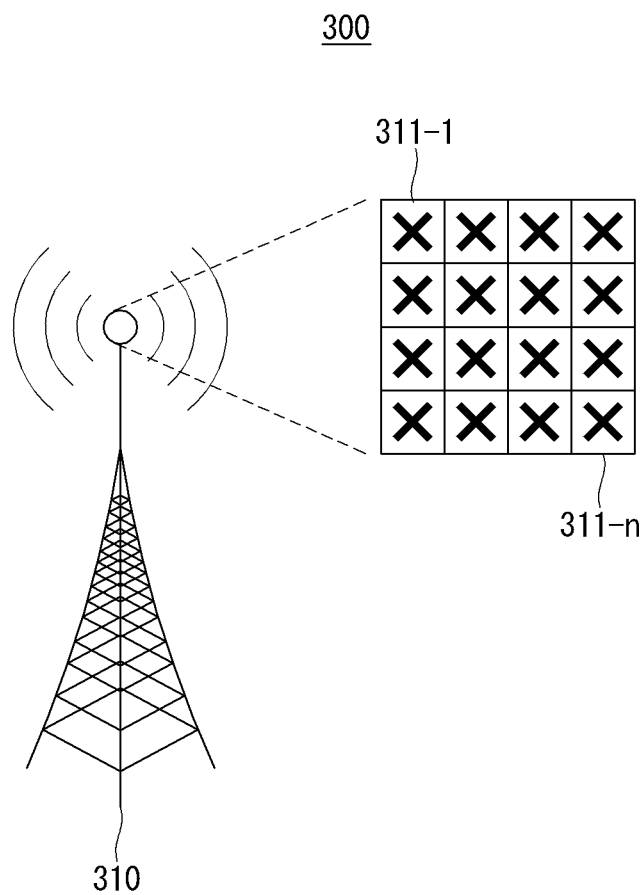
FIG. 3 is a conceptual diagram for describing various exemplary embodiments of an antenna configuration in a communication system.

FIG. 3 is a conceptual diagram for describing a first exemplary embodiment of an antenna configuration in a communication system.

As shown in FIG. 3, a communication system 300 may support multi-input multi-output (MIMO)-based communication. The communication system 300 may include one or more communication nodes that transmit and/or receive wireless signals. The one or more communication nodes included in the communication system 300 may be the same as or similar to the plurality of base stations 110-1, 110-2, 110-3, 120-1, and 120-2, and the plurality of terminals 130-1, 130-2, 130-3, 130-4, 130-5, and 130-6 described with reference to FIG. 1. Each of the one or more communication nodes included in the communication system 300 may be the same as or similar to the communication node 200 described with reference to FIG. 2. Each of the one or more communication nodes included in the communication system 300 may include one or more antennas capable of transmitting and/or receiving wireless signals based on MIMO.

In order to process rapidly increasing wireless data, the 5G NR communication or subsequent wireless communication technologies can support communication in relatively high frequency bands. For example, radio frequency bands used for wireless communication may be broadly classified into frequency range 1 (FR1) bands and frequency range 2 (FR2) bands. Here, the FR1 bands may refer to relatively low frequency bands of about 7 GHz or below. The FR2 bands may refer to relatively high frequency bands of about 7 GHz or above.

In a relatively high frequency band such as a 24-53 GHz band corresponding to the FR2 band, an unlicensed band, and a millimeter wave band, a path loss may occur at a relatively high level. In an exemplary embodiment of a communication system using a high frequency band, the path loss problem may be solved by using a large number of antennas to transmit and receive a wireless signal (or beam) with high antenna gain.

For example, the communication system 300 may include a first antenna 310. The first antenna 310 may support MIMO. The first antenna 310 may be composed of n antenna elements 311-1, . . . , and 311-$n$ (n is a natural number). The n antenna elements 311-1, . . . , and 311-$n$ constituting the first antenna 310 may be arranged regularly or irregularly.

In an exemplary embodiment of the communication system 300, the first antenna 310 may have a uniform linear array (ULA) structure. In the first antenna 310 having the ULA structure, the antenna elements 311-1, . . . , and 311-$n$ may be arranged in a row at regular intervals.

Meanwhile, in another exemplary embodiment of the communication system 300, the first antenna 310 may have a uniform planar array (UPA) structure. In the first antenna 310 having the UPA structure, the antenna elements 311-1, . . . , and 311-$n$ may be arranged in a grid structure on a plane at regular intervals.

In an exemplary embodiment of the communication system, antenna ports and/or antenna panel(s) may be defined to improve operational efficiency for the antenna supporting MIMO. For example, the first antenna 310 may be composed of one or more antenna ports each composed of one or more antenna elements having the same channel. The first antenna 310 may have a single-panel antenna structure or a multi-panel antenna structure.

In an exemplary embodiment of the communication system, an antenna port may be configured as a basic unit of the antenna structure. An antenna port may be defined as one logical antenna composed of one or more antenna elements (or antennas) having the same channel. A channel of a specific symbol transmitted from one antenna port may be inferred from a channel of another symbol transmitted from the same antenna port.

For example, a channel through which a physical downlink shared channel (PDSCH) symbol of one antenna port is transmitted may be inferred from a channel through which a demodulation-reference (DM-RS) symbol associated with the PDSCH symbol is transmitted from the same antenna port. A channel through which a physical downlink control channel (PDCCH) symbol of one antenna port is transmitted may be inferred from a channel through which a DM-RS associated with the PDCCH symbol is transmitted from the same antenna port. A channel through which a physical broadcast channel (PBCH) symbol of one antenna port is transmitted may be inferred from a channel through which a DM-RS associated with the PBCH symbol is transmitted from the same antenna port.

If large-scale characteristics of a channel through which a symbol is transmitted from one antenna port can be estimated or inferred from a channel through which a symbol of another antenna port is transmitted, the two different antenna ports may be expressed as being quasi-co-located (QCLed). Here, the large-scale characteristics of the channel may include one or more of 'delay spread', 'Doppler spread', 'Doppler shift', 'average gain', 'average delay', or 'spatial Rx parameters'.

A structure in which all of one or more antenna elements (or antennas) constituting one antenna structure exist on one panel may be referred to as a 'single-panel antenna structure'. On the other hand, a structure in which a plurality of antenna elements (or antennas) constituting one antenna structure exist as being divided on a plurality of panels may be referred to as a 'multi-panel antenna structure'. The multi-panel antenna structure may have advantages such as high power gain and low computational complexity.

In an ultra-high frequency band such as a terahertz wave band, a very large number of antennas may need to be used to improve communication quality. As the number of antennas used for communication increases, the overhead and/or the amount of calculation required for communication may increase. Techniques for improving efficiency in transmitting and receiving wireless signals using a large number of antennas may be required in a relatively high frequency band.

Figure 4:
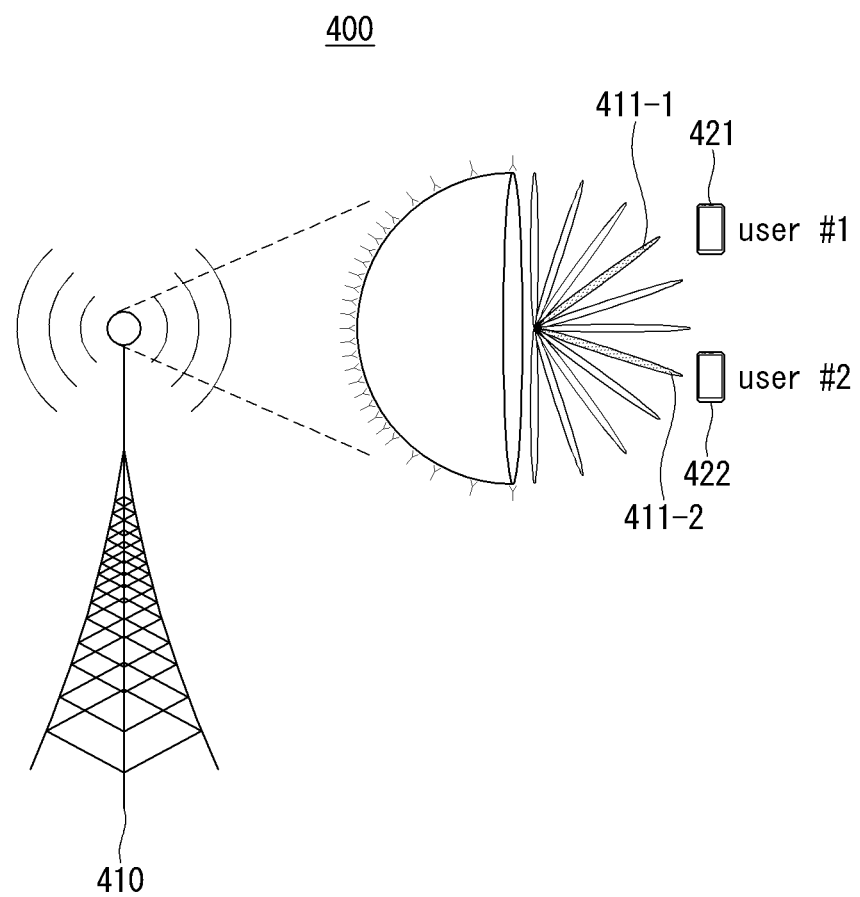
FIG. 4 is a conceptual diagram for describing various exemplary embodiments of an antenna configuration in a communication system.

FIG. 4 is a conceptual diagram for describing a second exemplary embodiment of an antenna configuration in a communication system.

As shown in FIG. 4, a communication system 400 may support MIMO-based communication. The communication system 400 may include one or more communication nodes that transmit and/or receive wireless signals. Each of the one or more communication nodes included in the communication system 400 may include one or more antennas capable of transmitting and/or receiving wireless signals based on MIMO. Hereinafter, in describing the second exemplary embodiment of the antenna configuration in the communication system with reference to FIG. 4, descriptions that overlap with those described with reference to FIGS. 1 to 3 may be omitted.

The communication system 400 may support communication in an ultra-high frequency band, such as a terahertz wave band. In an ultra-high frequency band such as a terahertz wave band, a very large number of antennas may need to be used to improve communication quality. Meanwhile, in a ultra-high frequency band such as a terahertz wave band, line-of-sight (LoS) components may dominate a received wireless signal, and non-LoS (NLoS) components may hardly exist in the receive wireless signal. The communication system 400 may include one or more antennas configured to easily support communication in an ultra-high frequency band, such as a terahertz wave band.

The communication system 400 may include a first communication node. The first communication node may include a first antenna 410. The first antenna 410 may support MIMO. The first antenna 410 may be composed of a plurality of antenna elements. The plurality of antenna elements constituting the first antenna 410 may be arranged regularly or irregularly. In an exemplary embodiment of the communication system 400, the first antenna 410 may have a structure in which a plurality of antenna elements are arranged at predetermined intervals.

In an antenna structure in which a plurality of antenna elements are arranged at regular intervals, such as the ULA structure or UPA structure, communication quality may be affected by a relationship between a spacing between the antenna elements and a wavelength of a wireless signal. In the antenna structure in which the plurality of antenna elements are arranged at regular intervals, an appropriate distance between antenna elements may be determined differently depending on a frequency, reference frequency, or carrier offset of a transmitted and received wireless signal.

In an ultra-high frequency band such as a terahertz wave band, a range of used frequencies may be relatively wide. For example, the terahertz wave band may be defined as a 0.1 to 10 THz band. In other words, even within a terahertz wave band, a range of used frequencies may vary by up to 100 times. Expressed differently, even within a terahertz wave band, a range of wavelengths of used wireless signals may vary by up to 100 times. That is, in an ultra-high frequency band such as a terahertz wave band, it may not be easy to respond to a change in allocated or used frequency resources unless a spacing between antenna elements constituting the antenna structure changes.

In an exemplary embodiment of the communication system 400, the first antenna 410 may have a 'lens MIMO' structure. The first antenna 410 may have the structure in which a plurality of antenna elements are arranged at regular intervals (hereinafter, 'antenna element spacing'). The first antenna 410 may further include one or more lenses capable of refracting radiated wireless signals and/or incident wireless signals. The lenses included in the first antenna 410 may be optical lenses capable of physically refracting light. Each of the lenses included in the first antenna 410 may be an electromagnetic wave (EM) lens capable of refracting electromagnetic waves (EM waves) through interaction with electromagnetic or electric fields.

In the first antenna 410 including one or more lenses, a received wireless signal may be incident as being refracted by at least one of the one or more lenses. Accordingly, in the first antenna 410, a frequency of the wireless signal incident on each antenna element may be adjusted to match the antenna element spacing of the first antenna 410. Alternatively, in the first antenna 410 including one or more lenses, a transmitted wireless signal may be radiated as being refracted by at least one of the one or more lenses. Accordingly, in the first antenna 410, a frequency of the wireless signal radiated from each antenna element may be radiated as being adjusted to match the antenna element spacing of the first antenna 410. As the lens (or the size of the lens) is variably applied in the antenna of the lens MIMO scheme according to a change in the frequency band, the communication node may receive or transmit the wireless signal in a manner appropriate for the frequency band without changing physical locations or arrangement of the antenna elements.

In an exemplary embodiment of the communication system 400, a first wireless signal received from a user #1 421 through a first receiving beam 411-1 may be incident on antenna elements of the first antenna 410 by being refracted by a first lens. A second wireless signal received from a user #2 422 through a second receiving beam 411-2 may be incident on antenna elements of the first antenna 410 by being refracted by a second lens.

In the first antenna 410, a lens for refracting the received signal may be used adaptively to a frequency of the received signal, reference frequency, and/or antenna element spacing. In the first antenna 410, a lens for refracting a transmission signal may be used adaptively to a frequency of the transmission signal, reference frequency, and/or antenna element spacing. For example, in an exemplary embodiment of the communication system 400, a mapping relationship that is the same as or similar to Table 1 may be established.

TABLE 1

| Reference frequency | Frequency (THz) | Reference lens |
|---|---|---|
| $F_{REF}$ #1 | A | Lens #1 |
| $F_{REF}$ #2 | B | Lens #2 |
| $F_{REF}$ #3 | C | Lens #3 |
| $F_{REF}$ #4 | D | Lens #4 |

Referring to Table 1, frequencies of wireless signals received by the first antenna 410 in the communication system 400 may be set based on one or more preset reference frequencies. For example, in the communication system 400, four reference frequencies may be set for wireless signal transmission and reception between one or more communication nodes. The four reference frequencies may correspond to $F_{REF}$ #1 (A THz), $F_{REF}$ #2 (B THz), $F_{REF}$ #3 (C THz), and $F_{REF}$ #4 (D THz).

The identifiers of the lenses may be expressed as in Table 1, or may be expressed as decimal values (i.e. 0, 1, 2, 3) or 2-bit binary values (i.e. 00, 01, 10, 11). A unit of a frequency value and a divided frequency band may be THz. In Table 1, a relationship of 'A<B<C<D' may be stablished. However, this is merely an example for convenience of description, and exemplary embodiments of the communication system are not limited thereto.

The four reference frequencies (i.e. $F_{REF}$ #1 to $F_{REF}$ #4) may be references for frequencies of wireless signals transmitted and received between one or more communication nodes. A frequency of each of wireless signals transmitted and received between one or more communication nodes may be set based on one (hereinafter, $F_{REF}$ #n) of the four reference frequencies (i.e. $F_{REF}$ #1 to $F_{REF}$ #4) and a predetermined frequency difference $F_{Diff}$.

In an exemplary embodiment of the communication system 400, each of the four reference frequencies (i.e. $F_{REF}$ #1 to $F_{REF}$ #4) may correspond to the minimum (or lowest) frequency of wireless signals transmitted and received between one or more communication nodes. In the instant case, each of the wireless signals transmitted and received between one or more communication nodes may be configured to have a frequency of $F_{REF}$ #n to ($F_{REF}$ #n+$F_{Diff}$).

In an exemplary embodiment of the communication system 400, each of the four reference frequencies (i.e. $F_{REF}$ #1 to $F_{REF}$ #4) may correspond to the maximum (or highest) frequency of wireless signals transmitted and received between one or more communication nodes. In the instant case, each of the wireless signals transmitted and received between one or more communication nodes may be configured to have a frequency of ($F_{REF}$ #n-$F_{Diff}$) to $F_{REF}$ #n.

In an exemplary embodiment of the communication system 400, each of the four reference frequencies (i.e. $F_{REF}$ #1 to $F_{REF}$ #4) may correspond to a center frequency of wireless signals transmitted and received between one or more communication nodes. In the instant case, each of the wireless signals transmitted and received between one or more communication nodes may be configured to have a frequency of ($F_{REF}$ #n-$F_{Diff}$) to ($F_{REF}$ #n+$F_{Diff}$).

The communication node may transmit or receive a wireless signal using a lens corresponding to a reference frequency corresponding to the transmitted or received wireless signal. For example, when receiving a wireless signal corresponding to $F_{REF}$ #n, the first communication node including the first antenna 410 may receive the wireless signal using a lens #n in the first antenna 410. On the other hand, when transmitting a wireless signal corresponding to $F_{REF}$ #n, the first communication node including the first antenna 410 may transmit the wireless signal using the lens #n in the first antenna 410.

Meanwhile, a frequency of each wireless signal transmitted and received between one or more communication nodes may be set within a frequency band corresponding to one of the four reference frequencies (i.e. $F_{REF}$ #1 to $F_{REF}$ #4). For example, in an exemplary embodiment of the communication system 400, a mapping relationship identical or similar to Table 2 may be established.

TABLE 2

| Reference frequency | Frequency (THz) | Reference frequency band (THz) | Reference lens |
|---|---|---|---|
| $F_{REF}$ #1 | A | A1~A2 | Lens #1 |
| $F_{REF}$ #2 | B | B1~B2 | Lens #2 |
| $F_{REF}$ #3 | C | C1~C2 | Lens #3 |
| $F_{REF}$ #4 | D | D1~D2 | Lens #4 |

The communication node may transmit or receive a wireless signal using a lens corresponding to a frequency band of the transmitted or received wireless signal. For example, when the first communication node including the first antenna 410 receives a wireless signal having a frequency within a frequency band (N1 to N2 THz band) corresponding to the reference frequency $F_{REF}$ #n, the first communication node may receive the wireless signal by using the lens #n in the first antenna 410. On the other hand, when the first communication node including the first antenna 410 transmits a wireless signal having a frequency within the frequency band (N1 to N2 THz) corresponding to the reference frequency $F_{REF}$ #n, the first communication node may transmit the wireless signal by using the lens #n in the first antenna 410.

At least some of the information included in Table 1 or Table 2 (e.g. reference frequency information, reference lens information, etc.) may be transmitted through system information (e.g. system information block (SIB), master information block (MIB), etc.), RRC message (e.g. RRCReconfiguration, etc.), or the like. For example, at least some of the information included in Table 1 or Table 2 (such as reference frequency information, reference lens information, etc.) may be transmitted by the base station to the terminal through system information or RRC message, etc.

The first communication node may receive at least some of information included in Table 1 or Table 2 (such as reference frequency information, reference lens information, etc.) or their mapping relationships from another communication node. For example, when the first communication node is a terminal, the first communication node may identify at least some of the information included in Table 1 or Table 2 and their mapping relationship based on indication information received from the base station. On the other hand, the first communication node may configure at least some of the information included in Table 1 or Table 2 and their mapping relationship on its own. For example, when the first communication node is a base station or a terminal, the first communication node may determine a plurality of lenses (or reference lens information indicating the plurality of lenses) suitable for receiving wireless signals at the respective plurality of reference frequencies, based on information on a wavelength corresponding to each of the plurality of reference frequencies and a spacing between antenna elements constituting the first antenna 410.

Among the factors that determine reference lens information, the size of the lens may be determined based on the number of antenna elements or the spacing between the antenna elements in the antenna having the lens MIMO structure. For example, the total number M of antennas constituting the first antenna 410 (or the maximum value of the number M of antennas) may be expressed as M=1+⌊2L/λ⌋. Here, L may correspond to the size of the lens (e.g. diameter, radius, perimeter, etc.), and λ may correspond to the wavelength of the wireless signal. Since the size of the lens may be inversely proportional to the wavelength, the first communication node may apply a lens that is smaller in size as a larger reference frequency (or frequency band with a larger reference frequency value) is used, thereby enabling communication while maintaining the existing antenna array. For example, in Table 1, when A<B<C<D, it can be seen that the lens #1 has the largest size and the lens #4 has the smallest size among the reference lenses corresponding to the respective frequencies. However, this is merely an example for convenience of description, and in the second exemplary embodiment of the antenna configuration in the communication system, the lens may be determined by adjusting various factors (such as size, refractive index, etc.) for determining the lens according to a change in the frequency band.

In FIG. 4, the antenna elements of the first antenna 410 using a three-dimensional lens are shown as being arranged along a three-dimensional hemisphere, but this is merely an example for convenience of description, and the second exemplary embodiment of the antenna configuration in the communication system is not limited thereto. For example, in an exemplary embodiment of the communication system 400, a two-dimensional or three-dimensional lens may be used in the lens MIMO antenna. In the lens MIMO antenna, antenna elements may be arranged in a two-dimensional or three-dimensional structure. In the lens MIMO antenna, antenna elements may be arranged on a plane, arc, or sphere.

In an exemplary embodiment of the communication system 400, antenna elements arranged in a two-dimensional structure in the lens MIMO antenna may be regarded as corresponding to the ULA structure described with reference to FIG. 3. Antenna elements arranged in a three-dimensional structure in the lens MIMO antenna may be regarded as corresponding to the UPA structure described with reference to FIG. 3.

Figure 5:
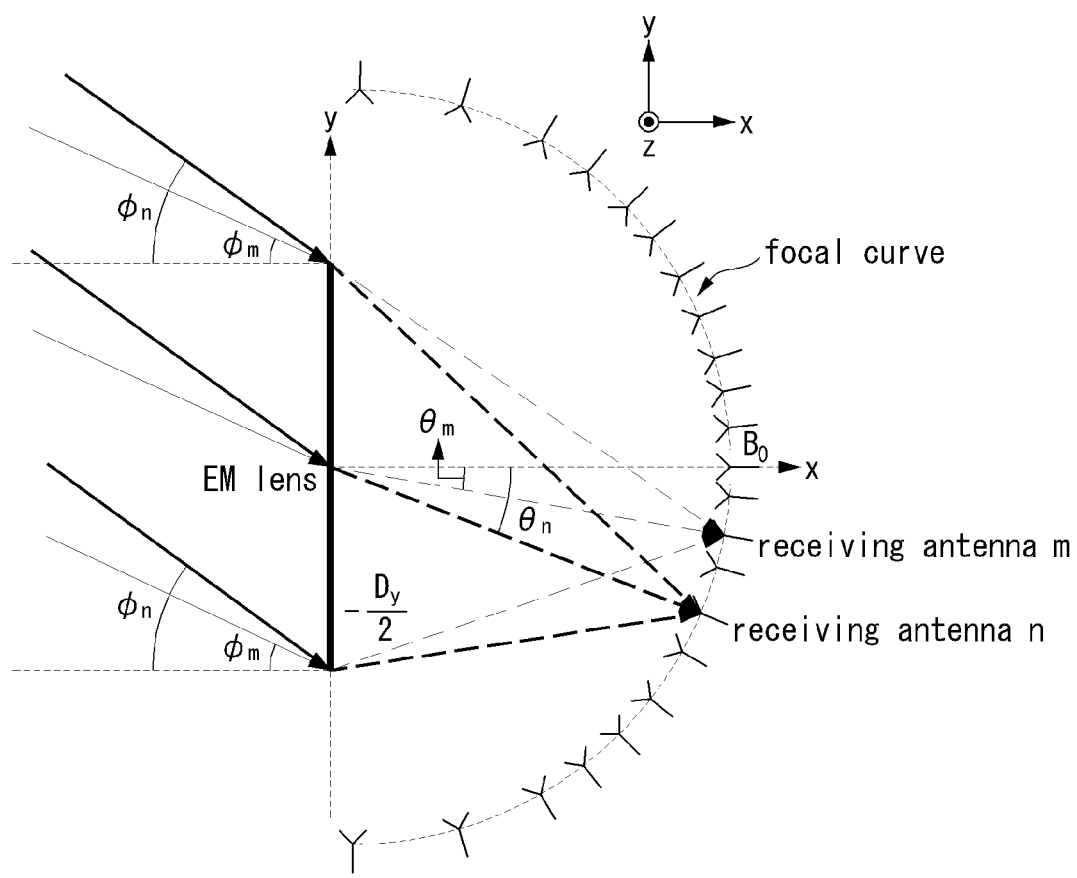
FIG. 5 is a conceptual diagram for describing an exemplary embodiment of an angle of arrival estimation method in a communication system.

FIG. 5 is a conceptual diagram for describing an exemplary embodiment of an angle of arrival estimation method in a communication system.

As shown in FIG. 5, a communication system may support MIMO-based communication. The communication system may include one or more communication nodes that transmit and/or receive wireless signals. Each of the one or more communication nodes included in the communication system may include one or more antennas capable of transmitting and/or receiving wireless signals based on MIMO. Each of the one or more communication nodes included in the communication system may include one or more antennas that are the same as or similar to the first antenna 410 described with reference to FIG. 4. Hereinafter, in describing an exemplary embodiment of the angle of arrival (AoA) estimation method in the communication system with reference to FIG. 5, descriptions that overlap with those described with reference to FIGS. 1 to 4 may be omitted.

A first communication node may include a first antenna for receiving and/or transmitting wireless signals. The first antenna may be the same as or similar to the first antenna 410 described with reference to FIG. 4. The first antenna may be configured to have a lens MIMO structure. The first antenna may include one or more lenses that refract the transmitted or received wireless signal.

Antenna responses detected or measured by a plurality of antenna elements constituting the first antenna may have the same or similar pattern as a sinc function. The sinc function may be defined identically or similarly to Equation 1.

$$\mathrm{sinc}\, x = \frac{\sin kx}{kx} \qquad \text{[Equation 1]}$$

In Equation 1, k may be a real number such as 1 or pi. An antenna closer to a location corresponding to a main lobe (i.e. median) of the sinc function may have a larger antenna response, and an antenna farther from the location corresponding to the main lobe may have a smaller antenna response. The location of the main lobe of the sinc function with respect to the antenna response may be determined according to an AoA of a received signal. A receiving node may estimate the AoA of the received signal by identifying an antenna element (or its index) corresponding to the location of the main lobe, as shown in FIG. 5. For example, the first communication node may estimate the AoA of the received signal by sequentially activating a plurality of antenna elements constituting the first antenna and confirming the location corresponding to the main lobe of the sync function.

The AoA ($\phi_m$, $\phi_n$, etc.) may be estimated based on an angle ($\theta_m$, $\theta_n$, etc.) between each receiving antenna element (m, n, etc.) and a center line (imaginary line between the center of the first antenna and a point B0). Alternatively, the AoA for each antenna element, which is estimated in the above-described manner, may be expressed as $\theta_m$ and $\theta_n$.

In the exemplary embodiment shown in FIG. 5, the size (diameter, length, etc.) of the EM lens may correspond to $D_y$. The distance between the center of the lens and the lower end thereof may correspond to $D_y/2$, and the distance between the center of the lens and the upper end thereof may correspond to $D_y/2$. The spacing between antenna elements may be set uniformly. Alternatively, the spacing between antenna elements may be set based on the angle ($\theta_m$, $\theta_n$, etc.) between each receiving antenna element (m, n, etc.) and the center line. For example, the spacing between antenna elements may be set to be proportional to a sine value (sin $\theta_m$, sin $\theta_n$, etc.) of the angle ($\theta_m$, $\theta_n$, etc.) between each receiving antenna element (m, n, etc.) and the center line.

FIG. 5 shows an exemplary embodiment in which the first antenna includes two-dimensionally arranged antenna elements and a two-dimensional lens. In the instant case, the first communication node may sequentially activate or deactivate each of the two-dimensionally arranged antenna elements and identify a reception result of the wireless signal incident through the two-dimensional lens. Through this, the first communication node may estimate the AoA of the received signal. However, this is merely an example for convenience of description, and exemplary embodiments of the communication system are not limited thereto. For example, the first antenna may be configured to include three-dimensionally arranged antenna elements and a three-dimensional lens. In the instant case, the first communication node may sequentially activate or deactivate each of the three-dimensionally arranged antenna elements and identify a reception result of the wireless signal incident through the three-dimensional lens. Through this, the first communication node may estimate the AoA of the received signal.

The communication system may support a lens MIMO antenna that takes into account the broadband characteristics of an ultra-high frequency band such as a terahertz wave band. An exemplary embodiment of the communication system may support a scheme of variably setting the size of the lens according to a change in the ultra-high frequency band such as a terahertz wave band.

An exemplary embodiment of the communication system may use a lens MIMO antenna composed of a plurality of antenna elements, and support a two-step AoA estimation scheme to reduce the amount of calculation or complexity required to estimate an AoA and a channel of a received signal. The two-step AoA estimation scheme may include a first step of dividing antenna elements into a plurality of antenna groups and deriving a candidate antenna group by comparing an estimated received strength at each antenna group with a predetermined threshold, and a second step of estimating the number of reception paths and an AoA of each path through precise sensing.

Although the scheme of estimating an AoA of a received signal in the lens MIMO antenna has been described, but exemplary embodiments of the communication system are not limited thereto. For example, in an exemplary embodiment of the communication system, the configurations described with reference to FIG. 5 may be applied identically or similarly to a process in which a communication node that transmits a wireless signal selects an antenna element (or antenna) to transmit the wireless signal based on an angle of departure (AoD) of the wireless signal.

Alternatively, in an exemplary embodiment of the communication system, the configurations described with reference to FIG. 5 may be applied identically or similarly to a process of selecting antenna elements that are actually used (or activated) in communication between transmitting and receiving nodes including lens MIMO antennas.

Figure 6:
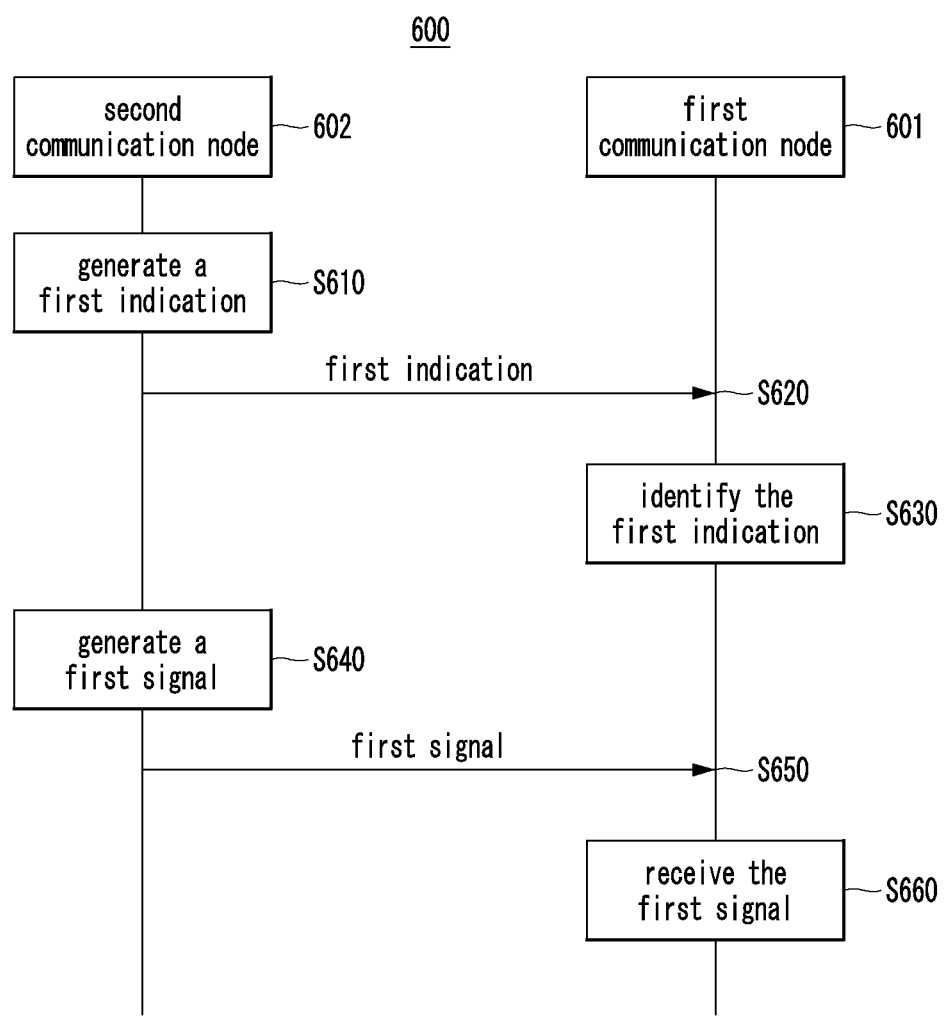
FIG. 6 is a sequence chart for describing various exemplary embodiments of a signal transmission and reception method in a communication system.

FIG. 6 is a sequence chart for describing a first exemplary embodiment of a signal transmission and reception method in a communication system.

As shown in FIG. 6, a communication system 600 may support MIMO-based communication. The communication system may include one or more communication nodes that transmit and/or receive wireless signals. Each of the one or more communication nodes included in the communication system may include one or more antennas capable of transmitting and/or receiving wireless signals based on the lens MIMO scheme. Each of the one or more communication nodes included in the communication system may include one or more antennas that are the same as or similar to the first antenna 410 described with reference to FIG. 4. According to the first exemplary embodiment of the signal transmission and reception method in the communication system, operations for selecting a lens may be performed in the lens MIMO scheme. Hereinafter, in describing the first exemplary embodiment of the signal transmission and reception method in the communication system with reference to FIG. 6, descriptions that overlap with those described with reference to FIGS. 1 to 5 may be omitted.

In an exemplary embodiment of the communication system 600, a first communication node 601 may correspond to a receiving node and a second communication node 602 may correspond to a transmitting node. The second communication node 602 may transmit data to the first communication node 601 through a first signal in an ultra-high frequency band, such as a terahertz wave band. The first communication node 601 may use one or more lens MIMO-based antennas to receive signals transmitted from the second communication node 602 in an ultra-high frequency band such as a terahertz wave band. The second communication node 602 may transmit a first indication or first indication information to the first communication node 601 before transmitting the first signal to the first communication node 601.

On the other hand, in another exemplary embodiment of the communication system 600, the second communication node 602 may correspond to a base station, and the first communication node 601 may correspond to a terminal. The first communication node 601 may use one or more lens MIMO-based antennas to receive signals transmitted by the second communication 602 or other communication nodes in an ultra-high frequency band such as a terahertz wave band. The second communication node 602 may transmit a first indication or first indication information to the first communication node 601.

According to the first exemplary embodiment of the signal transmission and reception method in the communication system, the second communication node 602 may generate the first indication (S610). Here, the first indication may include information for reception of wireless signals using one or more lens MIMO-based antennas. The first indication may include information on a reference frequency, frequency band, corresponding lens, etc. of wireless signals transmitted from the second communication node 602. For example, the first indication may include at least some of the information shown in Table 1 or Table 2.

The second communication node 602 may transmit the first indication to the first communication node 601 (S620). The first indication may be transmitted to the first communication node 601 as being included in system information (such as SIB, MIB, etc.) or an RRC message (such as RRCReconfiguration, etc.) transmitted from the second communication node 602.

The first communication node 601 may receive the first indication transmitted from the second communication node 602 (S620). The first communication node 601 may identify information included in the first indication. For example, the first communication node 601 may identify information on the reference frequency, frequency band, corresponding lens, or the like of the wireless signals transmitted from the second communication node 602 based on the first indication.

The second communication node 602 may generate a first signal to transmit to the first communication node 601 (S640). The second communication node 602 may transmit the generated first signal to the first communication node 601 (S650). Here, the first signal may be transmitted based on the reference frequency and/or frequency band indicated by the first indication. The first communication node 601 may receive the first signal (S660). Here, the first communication node 601 may receive the first signal using a lens corresponding to the frequency of the first signal.

Meanwhile, if there is a change in the mapping relationship for the lens transmitted through the first indication, the second communication node 602 may inform this to the first communication node 601 through an additional signal (such as a second indication). Alternatively, the first communication node 601 may transmit information on a lens which the first communication node 601 uses for reception to the second communication node 602. The first communication node 601 and/or the second communication node 602 may set an index or indicator for each lens in the same or similar manner as shown in Table 3.

TABLE 3

| Reference lens | Lens index |
| --- | --- |
| Lens #1 | 0 (00) |
| Lens #2 | 1 (01) |
| Lens #3 | 2 (10) |
| Lens #4 | 3 (11) |

The index of the lens may be expressed as a decimal value (i.e. 0, 1, 2, 3) or 2-bit value (i.e., 00, 01, 10, 11), as shown in Table 3. In an exemplary embodiment of the communication system 600, when the frequency band (reference frequency) used for communication is changed to a new frequency band, the lens (or reference lens group) may need to be changed according to the changed frequency band (i.e. newly allocated frequency band). When the first communication node 601 is capable of utilizing a total of four lenses, the second communication node 602 may determine a lens suitable for a current situation of the first communication node 601 from among candidate lenses of the first communication node 601 based on the newly allocated frequency band, and transmit a signal indicating the first communication node 601 to select the corresponding lens. Information on the index or indicator for each lens as shown in Table 3 may be transmitted through system information or RRC message. When the number of lenses usable by the first communication node 601 is k, information on the index for each lens may be transmitted as being assigned to at least $\log_2 k$ bits. For example, when the number of usable lenses is 4 as shown in Table 3, information on the index for each lens may be transmitted as being allocated to at least 2 bits. On the other hand, when the number of usable lenses is 1, information on the index for each lens may be transmitted as being allocated to at least 1 bit.

The situation shown in FIG. 6 may correspond to a downlink transmission situation in which the second communication node 602 corresponding to the base station transmits signaling such as the first indication and wireless signals to one or more terminals including the first communication node 601. However, this is merely an example for convenience of description, and the first exemplary embodiment of the signal transmission and reception method in the communication system is not limited thereto. For example, the first exemplary embodiment of the signal transmission and reception method in the communication system may be applied to an uplink transmission situation in which the second communication node 602 is a terminal and the first communication node 601 is a base station. Alternatively, the first exemplary embodiment of the signal transmission and reception method in the communication system may not be limited to a specific transmission mode such as uplink transmission, downlink transmission, and sidelink transmission, and may be applied to a situation in which at least one of the transmitting and receiving nodes includes lens MIMO antenna(s). On the other hand, the first exemplary embodiment of the signal transmission and reception method in the communication system may be implemented in a scheme where the first communication node 601 transmits signaling (e.g. first indication) including information on reference frequencies to the second communication node 602, and receives a wireless signal transmitted from the second communication node 602 using one of the reference frequencies through a lens MIMO antenna.

Figure 7:
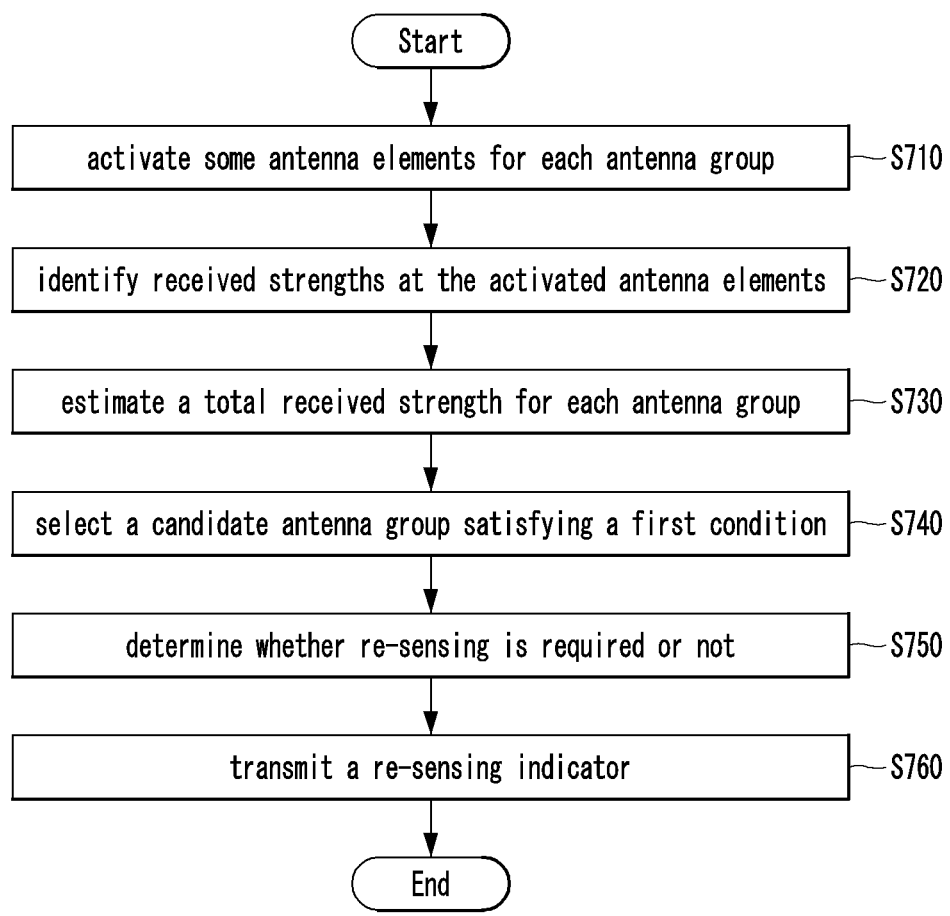
FIG. 7 is a sequence chart for describing various exemplary embodiments of a signal transmission and reception method in a communication system.

FIG. 7 is a sequence chart for describing a second exemplary embodiment of a signal transmission and reception method in a communication system.

As shown in FIG. 7, a communication system may support MIMO-based communication. The communication system may include one or more communication nodes that transmit and/or receive wireless signals. Each of the one or more communication nodes included in the communication system may include one or more antennas capable of transmitting and/or receiving wireless signals based on the lens MIMO scheme. The one or more communication nodes included in the communication system may be the same as or similar to at least some of the second communication node 602 and the first communication node 601 described with reference to FIG. 6. According to the second exemplary embodiment of the signal transmission and reception method in the communication system, operations for selecting a candidate antenna group for AoA estimation may be performed in the lens MIMO scheme. Hereinafter, in describing the second exemplary embodiment of the signal transmission and reception method in the communication system with reference to FIG. 7, descriptions that overlap with those described with reference to FIGS. 1 to 6 may be omitted.

The first communication node may activate some antenna elements for each antenna group (S710). The first communication node may perform primary sensing to identify received strengths at the activated antenna elements for each antenna group (S720). For example, the first communication node may divide a plurality of antenna elements included in the first antenna into a plurality of antenna groups in order to perform primary sensing. For example, the plurality of antenna elements included in the first antenna may be grouped into three antenna groups as shown in Table 4.

TABLE 4

| Antenna group | Antenna elements | Activated antenna elements |
| --- | --- | --- |
| G #1 | A #1, A #2, A #3, A #4, A #5, A #6 | A #3, A #4 |
| G #2 | A #7, A #8, A #9, A #10, A #11, A #12 | A #9, A #10 |
| G #3 | A #13, A #14, A #15, A #16, A #17, A #18 | A #15, A #16 |

The first communication node may activate some antenna elements among a plurality of antenna elements included in each antenna group. The first communication node may perform primary sensing through some antenna elements activated for each antenna group (hereinafter referred to as 'activated antenna elements'). Through the primary sensing, a received strength at each activated antenna element may be sensed. The received strength at each of the activated antenna elements may mean a reference signal received power (RSRP) for each of the activated antenna elements. The RSRP for each of the activated antenna elements may mean, for example, an RSRP of a reference signal received from the second communication node (e.g. SS-RSRP or CSI-RSRP, etc.).

When grouped into the antenna groups, the number of antenna groups, the number of antenna elements for each antenna group, the number of activated antenna elements for each antenna group, or the like may have a positive integer value of 1 or more. The number of antenna groups, the number of antenna elements for each antenna group, the number of activated antenna elements for each antenna group, or the like may be determined according to criteria such as the magnitude of RSRPs measured at the first communication node, the number of radio frequency (RF) chains of the first communication node, and the number of antennas that can be activated at the same time in the first communication node. For example, if the number of antenna elements that can be activated at the same time in the first communication node is two, and a power level at which the first communication node can detect signals is up to the second side lobe of a sync function when considering the magnitude of the RSRPs measured at the first communication node, the number of antenna elements with significant received powers may be 6. Here, 6 antenna elements may include two antenna elements included in the main lobe and four antenna elements corresponding to the number of both side lobes. In the instant case, as shown in Table 4, the number of antenna elements for each group may be set to 6. However, this is merely an example for convenience of description, and exemplary embodiments of the communication system are not limited thereto. For example, the grouping criteria for antenna groups (e.g. number of antenna groups, number of antenna elements for each antenna group, number of activated antenna elements for each antenna group, etc.) may be determined based on a priority of data to be transmitted or received by the first communication node, a packet delay budget (PDB) of the data, and a measures to minimize interference between communication nodes. The grouping criteria for antenna groups may be configured by the first communication node itself, or may be provided from the second communication node. For example, the second communication node may transmit information on the grouping criteria for antenna groups to the first communication node through system information or an RRC message. The first communication node may perform the antenna grouping based on the received information on the grouping criteria for antenna groups, and may transmit a feedback related thereto to the second communication node through an RRC message (e.g., RRCReconfigurationComplete, etc.). Alternatively, the first communication node may receive information on the grouping criteria for antenna groups from the second communication node through a UE information request or the like, and transmit a feedback related thereto to the second communication node through a UE information response. Alternatively, the information on the grouping criteria for antenna groups or the feedback on the number of antennas for each antenna group in accordance therewith may be transmitted through UE assistance information or a new separate RRC signaling.

The first communication node may estimate received strengths (i.e. a total received strength) for all antenna elements within each antenna group based on the received strengths identified for the respective activated antenna elements (S730). The first communication node may estimate received strengths at all antenna elements within each antenna group based on the received strengths at the activated antenna elements and predetermined scaling factors. Table 5 shows an exemplary embodiment of a scheme of identifying and estimating received strengths at all antenna elements A #1, A #2, A #3, A #4, A #5, and A #6 based on the received strengths identified at the activated antenna elements A #3 and A #4.

TABLE 5

| Antenna element | Scaling factor | Estimated RSRP |
|---|---|---|
| A #1 | $\rho_2$ | $\rho_2 \times RSRP_{3,4}$ |
| A #2 | $\rho_1$ | $\rho_1 \times RSRP_{3,4}$ |
| A #3 | $\rho_0$ | $\rho_0 \times RSRP_{3,4}$ |
| A #4 | $\rho_0$ | $\rho_0 \times RSRP_{3,4}$ |
| A #5 | $\rho_1$ | $\rho_1 \times RSRP_{3,4}$ |
| A #6 | $\rho_2$ | $\rho_2 \times RSRP_{3,4}$ |

In an exemplary embodiment of the communication system, assuming that a signal directed toward A #1 is actually received at A #1, the signal received at A #1 may have a form of an antenna response with a main lobe at A #1. However, if the currently activated antenna elements are A #3 and A #4, and the signal directed toward A #1 is actually measured at A #3 and A #4, an antenna response value corresponding to the second or third side lobe of the antenna response having the main lobe at the location of A #1 may be measured. In other words, if the antenna response of the signal directed toward A #1 corresponds to the main lobe of the sinc function at the location of A #1, the antenna response values measured at A #3 and A #4 may correspond to the second or third side lobe of the sinc function. In the instant case, the RSRP at A #1 may be estimated based on a ratio of the antenna response value corresponding to the main lobe and the antenna response value corresponding to each side lobe in the sinc function. Similarly, when estimating a received strength (RSRP) at another antenna element, estimation may be performed based on antenna response values corresponding to the main lobe and each side lobe. The operation for estimation may be performed identically or similarly within other reference antenna groups, or may also be performed between antenna elements included in different reference antenna groups. If the total number of antenna elements is not divided by the number of antenna elements for each group, the last antenna group may be formed according to the number of remaining antenna elements, and selection of activated antenna elements and estimation of received strengths therefor may be performed accordingly.

Referring to Table 5, the received strengths of the remaining antenna elements may be estimated through multiplication between the response values measured at the activated antenna elements in the antenna group G #1 and the scaling factors determined through an arbitrary calculation scheme. If the received strength measured at the activated antenna elements is $RSRP_{3,4}$, the estimated received strengths of the respective antenna elements may be calculated by considering relative locations of the respective antenna elements with respect to the activated antenna elements. For example, if a signal directed toward the antenna element A #1 is measured at the antenna element A #1, a power corresponding to the main lobe may be measured at A #1, but since the currently activated antenna elements are A #3 and A #4, a smaller power (e.g. a power corresponding to the second or third side lobe) may be measured. Therefore, assuming that the power measured at A #3 and #4 is for a signal directed toward the antenna element A #1 antenna, a product of $RSRP_{3,4}$ and a scaling factor $\rho_2$ (>1) corresponding to a ratio of the antenna response value of the main lobe to the antenna response value of the second or third side lobe may be regarded as corresponding to a result of estimating (or normalizing) the received strength at A #1. Similarly, assuming that a received signal is directed toward the antenna element A #2, a product of a scaling factor $\rho_1$ (>1) and $RSRP_{3,4}$ may be regarded as corresponding to a result of estimating (or normalizing) the received strength at A #2. That is, a difference in powers, which occurs because locations of the activated antenna elements and the location of the antenna element toward which the signal is actually directed are different, may be compensated according to the scaling factor. The scaling factor may mean a value for compensating for a power loss occurring when a signal directed toward each antenna element for which an RSRP is to be measured is measured at the activated antenna elements, and may be set based on antenna response values in form of the sinc function. The scaling factors may be determined through an arbitrary calculation scheme. For example, when $P_0$ is an average antenna response value of the main lobe and $P_i$ is an average antenna response value of the i-th side lobe, the scaling factors may set as '$\rho_0=1$', '$\rho_1=P_0/P_1$', '$\rho_2=P_0/P_2$', respectively. The response value of the activated antenna elements multiplied by the scaling factor may be set as a value (i.e. normalized measured value) obtained by dividing a value measured at the activated antenna elements in the antenna group configured as in Table 4 with the number of activated antenna elements. As a result, the estimated RSRP for each antenna element in each antenna group in Table 5 may be calculated based on the number of antenna elements in the group, the location of each antenna element, the measurement value obtained through the activated antenna elements, and the scaling factor corresponding to the location of each antenna element.

The first communication node may select a candidate antenna group based on the identified or estimated received strengths for all antenna elements included in the first antenna (S740). The first communication node may determine antenna elements that satisfy a first condition among all antenna elements included in the first antenna as the candidate antenna group. Here, the first condition may be expressed as Equation 2.

$$RSRP \geq RSRP_{TH1} \quad \text{[Equation 2]}$$

Among all antenna elements included in the first antenna, one or more antenna elements at which received strengths (RSRPs) are greater than or equal to a first threshold (e.g. $RSRP_{TH1}$) may be regarded as satisfying the first condition. In step S740, the determination of whether the first condition is satisfied may be performed in the same or similar manner as shown in Table 6.

TABLE 6

| Antenna element | Whether the first condition (RSRP ≥ $RSRP_{TH1}$) is satisfied or not | Satisfaction indicator |
| --- | --- | --- |
| A #1 | Unsatisfied | 0 |
| A #2 | Satisfied | 1 |
| A #3 | Satisfied | 1 |
| ... | ... | ... |
| A #17 | Satisfied | 1 |
| A #18 | Unsatisfied | 0 |

Referring to Table 6, the first communication node may identify antenna elements that satisfy the first condition and antenna elements that do not satisfy the first condition among all antenna elements based on the RSRPs. The first communication node may determine the antenna elements determined to satisfy the first condition among all antenna elements as the candidate antenna group.

The first threshold may mean an RSRP threshold for the primary sensing process. It may be defined as a value smaller than an RSRP threshold (e.g. second threshold) used in a secondary sensing process. That is, the first threshold may be used to filter out antenna elements at which RSRPs are too small through the primary sensing. The first threshold may be set by the second communication node and provided to the first communication node. Alternatively, the first threshold may be set as a value obtained by the first communication node receiving and interpreting information on a predetermined threshold set by the second communication node in consideration of a communication environment. Information on the first threshold may be transmitted through system information or an RRC message (e.g. RRC measurement configuration, MeasConfig of RRC reconfiguration, RRC reconfiguration, etc.). Alternatively, the first threshold value may be set by the first communication node itself.

For antenna elements determined to satisfy the first condition, the satisfaction indicator may be set to 1. On the other hand, for antenna elements that are determined not to satisfy the first condition, the satisfaction indicator may be set to 0. However, this is merely an example for convenience of description, and exemplary embodiments of the method for transmitting and receiving signals are not limited thereto. For example, in another exemplary embodiment of the communication system, the satisfaction indicator may be set to 0 for antenna elements that satisfy the first condition, and the satisfaction indicator may be set to 1 for antenna elements that do not satisfy the first condition.

The first communication node may determine whether re-sensing is required (S750). The first communication node may determine whether re-sensing or a re-sensing procedure is required based on the number of antenna elements included in the candidate antenna group selected in step S740. The first communication node may determine that a re-sensing procedure is required when the number of antenna elements included in the candidate antenna group is too large or too small. For example, if the number of antenna elements included in the candidate antenna group is too large, computational complexity may increase for precise additional sensing (e.g. secondary sensing) for the candidate antenna group. On the other hand, for example, if the number of antenna elements included in the candidate antenna group is too small, an accuracy of AoA estimation through additional sensing may decrease.

The first communication node may determine that a re-sensing procedure is required when the number of antenna elements included in the candidate antenna group is less than a first reference number or exceeds a second reference number. Meanwhile, the first communication node may determine that a re-sensing procedure is not required when the number of antenna elements included in the candidate antenna group is greater than or equal to the first reference number and less than or equal to the second reference number. The criteria for determining whether a re-sensing procedure is required (e.g. first and second reference numbers) may be provided in advance from the second communication node. For example, the second communication node may provide information on the criteria for determining whether a re-sensing procedure is required in advance to the first communication node through system information or an RRC message. The first communication node may determine whether a re-sensing procedure is required based on the information provided from the second communication node. Alternatively, the criteria for determining whether a re-sensing procedure is required may be set by the first communication node itself.

The first communication node may transmit a re-sensing indicator to the second communication node based on a result of the determination in step S750 (S760). The re-sensing indicator may indicate whether a re-sensing procedure is required. The re-sensing procedure may mean that the operations according to steps S710 to S740 are performed again. When the re-sensing indicator indicates that a re-sensing procedure is required, the second communication node may transmit wireless signals for sensing at the first communication node again to the first communication node. The first communication node may re-perform the operations according to steps S710 to S740 based on a result of reception of the wireless signals transmitted again from the second communication node. In an exemplary embodiment of the communication system, the re-sensing indicator may be set in the same or similar manner as Table 7.

TABLE 7

| Re-sensing indicator | Re-sensing indicator information |
|---|---|
| 0 | Re-sensing procedure is not required |
| 1 | Re-sensing procedure is required |

Table 7 is merely an example for convenience of description, and exemplary embodiments of the communication system are not limited thereto. For example, in another exemplary embodiment of the communication system, when the value of the re-sensing indicator is set to 1, it may mean that a re-sensing procedure is required, and when the value of the re-sensing indicator is set to 0, it may mean that a re-sensing procedure is not required.

The re-sensing indicator set as shown in Table 7 may be transmitted through uplink control information (UCI), downlink control information (DCI), etc., and may be transmitted through RRC signaling such as UE Information Response, UE Assistance Information, etc. Alternatively, new RRC signaling may be defined for transmission of the re-sensing indicator.

When the re-sensing indicator is transmitted in step S760, the second communication node may transmit additional signals for the re-sensing procedure to the first communication node. The first communication node may perform re-sensing by receiving the additional signals transmitted for the re-sensing procedure. Meanwhile, when the re-sensing indicator is transmitted in step S760, the first and/or second communication node may perform operations to reset the size of the first threshold for candidate antenna group selection. The second communication node may transmit signaling to change (increase or decrease) the size of the first threshold for candidate antenna group selection to the first communication node. Alternatively, the first communication node may independently change (increase or decrease) the size of the first threshold for candidate antenna group selection.

Figure 8:
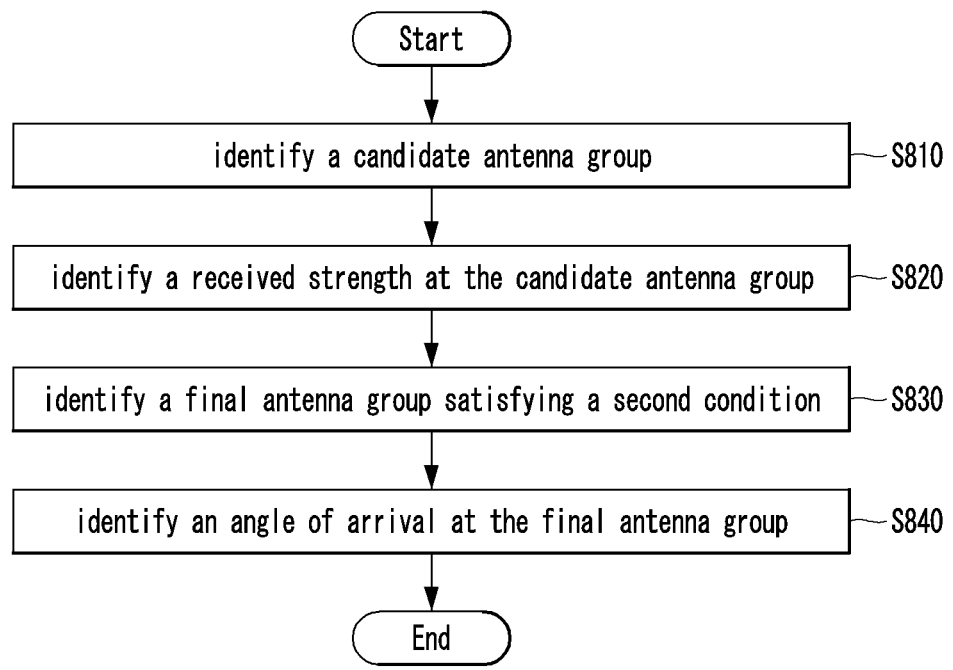
FIG. 8 is a sequence chart for describing various exemplary embodiments of a signal transmission and reception method in a communication system.

FIG. 8 is a sequence chart for describing a third exemplary embodiment of a signal transmission and reception method in a communication system.

As shown in FIG. 8, a communication system may support MIMO-based communication. The communication system may include one or more communication nodes that transmit and/or receive wireless signals. Each of the one or more communication nodes included in the communication system may include one or more antennas capable of transmitting and/or receiving wireless signals based on the lens MIMO scheme. The one or more communication nodes included in the communication system may be the same as or similar to at least some of the second communication node 602 and the first communication node 601 described with reference to FIG. 6. According to the third exemplary embodiment of the signal transmission and reception method in the communication system, operations for selecting a candidate antenna group for AoA estimation may be performed for the lens MIMO scheme. Hereinafter, in describing the third exemplary embodiment of the signal transmission and reception method in the communication system with reference to FIG. 8, descriptions that overlap with those described with reference to FIGS. 1 to 7 may be omitted.

According to the third exemplary embodiment of the signal transmission and reception method in the communication system, the first communication node may perform secondary sensing (e.g. more precise sensing) on antenna elements included in the candidate antenna group identified based on the second exemplary embodiment of the signal transmission and reception method in the communication system. The first communication node may identify antenna elements through which wireless signals are significantly received based on received strengths for the respective antenna elements obtained as a result of the secondary sensing. The first communication node may determine the antenna elements through which wireless signals are significantly received as a final antenna group. The first communication node may determine that an AoA identified at the antenna elements included in the final antenna group corresponds to an AoA of the received signals. In other words, when the first communication node detects a received strength equal to or greater than a certain level at a specific antenna element among the antenna elements of the candidate antenna group selected through primary sensing, the first communication node may determine the wireless signal is received at the AoA corresponding to the specific antenna element.

Specifically, the first communication node may identify a candidate antenna group among the antenna elements constituting the first antenna configured in the lens MIMO scheme (S810). Here, the candidate antenna group may be the same or similar to the candidate antenna group selected in step S740 described with reference to FIG. 7.

The first communication node may identify received strengths at antenna elements constituting the candidate antenna group (S820). Here, the received strength may correspond to an RSRP. The first communication node may identify a final antenna group that satisfies a second condition (S830). For example, the first communication node may identify the final antenna group that satisfies the second condition among the antenna elements constituting the candidate antenna group based on a result of the identification in step S820. Here, the second condition may be expressed as Equation 3.

$$RSRP \geq RSRP_{TH2} \qquad \text{[Equation 3]}$$

Among the antenna elements constituting the candidate antenna group, one or more antenna elements at which received strengths (RSRPs) are greater than or equal to a second threshold (e.g. $RSRP_{TH2}$) may be regarded as satisfying the second condition. In step S830, the determination of whether the second condition is satisfied may be performed in the same or similar manner as shown in Table 8.

TABLE 8

| Antenna element | RSRP | Whether the second condition (RSRP ≥ $RSRP_{TH2}$) is satisfied or not | Satisfaction indicator |
|---|---|---|---|
| A #2 | RSRP__56 | Unsatisfied | 0 |
| A #3 | RSRP__108 | Satisfied | 1 |
| A #10 | RSRP__111 | Satisfied | 1 |

TABLE 8-continued

| Antenna element | RSRP | Whether the second condition (RSRP ≥ $RSRP_{TH2}$) is satisfied or not | Satisfaction indicator |
|---|---|---|---|
| A #11 | RSRP_68 | Unsatisfied | 0 |
| A #16 | RSRP_103 | Satisfied | 1 |
| A #17 | RSRP_73 | Unsatisfied | 0 |

Referring to Table 8, the candidate antenna group may include antenna elements A #2, A #3, A #10, A #11, A #16, and A #17. The RSRP for each antenna element may correspond to the received strength identified in step S820. The RSRP for each antenna element may mean an RSRP of a reference signal received from the second communication node (e.g. SS-RSRP or CSI-RSRP, etc.). Based on the RSRPs, the first communication node may determine that A #3, A #10, and A #16 among all antenna elements satisfy the second condition. The first communication node may determine A #3, A #10, and A #16 determined to satisfy the second condition among all antenna elements as the final antenna group.

The second threshold may mean an RSRP threshold for the secondary sensing process, and may be defined as a value greater than the first threshold. The second threshold may be set by the second communication node and provided to the first communication node. Alternatively, the first threshold may be set as a value obtained by the first communication node receiving and interpreting information on a predetermined threshold set by the second communication node in consideration of a communication environment. Information on the second threshold may be transmitted through system information or an RRC message (e.g. RRC measurement configuration, MeasConfig of RRC reconfiguration, RRC reconfiguration, etc.). Alternatively, the second threshold value may be set by the first communication node itself.

For antenna elements A #3, A #10, and A #16 determined to satisfy the second condition, the satisfaction indicator may be set to 1. On the other hand, for antenna elements A #2, A #11, and A #17 that are determined not to satisfy the second condition, the satisfaction indicator may be set to 0. However, this is merely an example for convenience of description, and exemplary embodiments of the signal transmission and reception method are not limited thereto. For example, in another exemplary embodiment of the communication system, the satisfaction indicator may be set to 0 for antenna elements that satisfy the second condition, and the satisfaction indicator may be set to 1 for antenna elements that do not satisfy the second condition.

The first communication node may identify an AoA at each antenna element included in the final antenna group (S840). For example, the first communication node may identify AoAs at A #3, A #10, and A #16 included in the final antenna group. A result of the identification in step S840 may be summarized as Table 9.

TABLE 9

| Antenna element | path | AoA |
|---|---|---|
| A #3 | Path #1 | $\theta_3$ |
| A #10 | Path #2 | $\theta_{10}$ |
| A #16 | Path #3 | $\theta_{16}$ |

According to Table 9, it may be determined that the AoAs at the antenna elements that satisfy the second condition correspond to paths of wireless signals received at the first communication node. For example, the AoA $\theta_3$ at the antenna element A #3 may be estimated to correspond to an AOA of a wireless signal received through a path #1. The AoA $\theta_{10}$ at the antenna element A #10 may be estimated to correspond to an AoA of a wireless signal received through a path #2. The AoA $\theta_{16}$ at the antenna element A #16 may be estimated to correspond to an AoA of a wireless signal received through a path #3.

When there are no antenna elements that satisfy the second condition, it may be determined that the wireless signals are not being received effectively enough to estimate the AoAs. On the other hand, when there is one antenna element that satisfies the second condition, the wireless signal may be regarded as being received through one path corresponding to one AoA. When there are a plurality of antenna elements that satisfy the second condition, the wireless signal may be regarded as being received through one path (i.e. single path) or a plurality of paths (i.e. multi-path). When the AoAs identified at the plurality of antenna elements that satisfy the second condition have the same value, the AoAs having the same value may be regarded as corresponding to the same or different reception paths.

Information on the AoA(s) identified in step S840 may be used for channel estimation. For example, the information on the AoA(s) identified in step S840 may be used to estimate a channel between the communication node transmitting the wireless signal and the first communication node. The information on the AoAs identified in step S840 may be used for a channel state information (CSI) reporting procedure between the communication node transmitting the wireless signal and the first communication node.

Figure 9:
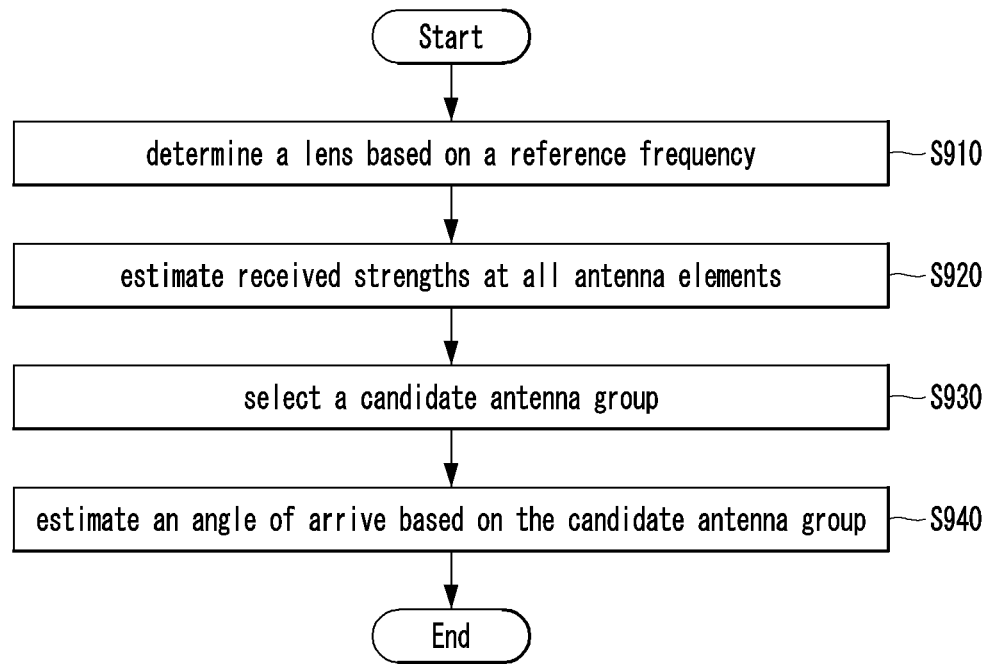
FIG. 9 is a sequence chart for describing various exemplary embodiments of a signal transmission and reception method in a communication system.

FIG. 9 is a sequence chart for describing a fourth exemplary embodiment of a signal transmission and reception method in a communication system.

As shown in FIG. 9, a communication system may support MIMO-based communication. The communication system may include one or more communication nodes that transmit and/or receive wireless signals. Each of the one or more communication nodes included in the communication system may include one or more antennas capable of transmitting and/or receiving wireless signals based on the lens MIMO scheme. The one or more communication nodes included in the communication system may be the same as or similar to at least some of the second communication node 602 and the first communication node 601 described with reference to FIG. 6. Hereinafter, in describing the fourth exemplary embodiment of the signal transmission and reception method in the communication system with reference to FIG. 9, descriptions that overlap with those described with reference to FIGS. 1 to 8 may be omitted.

In an exemplary embodiment of the communication system, the first communication node may perform an operation of determining a lens to be used for reception of wireless signals at the first antenna configured in the lens MIMO scheme (S910). In step S910, the first communication node may perform operations that are the same as or similar to at least some of the operations constituting the first exemplary embodiment of the signal transmission and reception method in the communication system described with reference to FIG. 6. The first communication node may determine a lens to be used for each reference frequency or frequency band based on the first indication received from the second communication node.

In an exemplary embodiment of the communication system, the first communication node may perform estimation of received strengths at all antenna elements constituting the first antenna (S920). The first communication node may select a candidate antenna group from all antenna elements based on a result of the estimation in step S920 (S930). In steps S920 and S930, the first communication node may perform operations that are the same or similar to at least some of the operations constituting the second exemplary embodiment of the signal transmission and reception method in the communication system described with reference to FIG. 7. The first communication node may identify received strengths of some antenna elements activated for each antenna group and estimate received strengths of all antenna elements based on the identified received strengths. The first communication node may select a candidate antenna group that satisfies the first condition based on the estimated received strengths. The first communication node may determine whether a re-sensing procedure is required based on a result of selecting the candidate antenna group. The first communication node may transmit a re-sensing indicator to the second communication node based on a result of determining whether a re-sensing procedure is required.

In an exemplary embodiment of the communication system, the first communication node may perform AoA estimation based on the candidate antenna group selected in step S930 (S940). In step S940, the first communication node may perform operations that are the same as or similar to at least some of the operations constituting the third exemplary embodiment of the signal transmission and reception method in the communication system described with reference to FIG. 8. The first communication node may identify a final antenna group that satisfies the second condition by identifying received strengths at the candidate antenna group. The first communication node may identify AoAs at the antenna elements constituting the final antenna group.

In an exemplary embodiment of the communication system, the first communication node may receive the first indication from the second communication node. Based on the received first indication, the first communication node may identify reference frequency information for determining a lens to be applied to the first antenna included in the first communication node and including a plurality of antenna elements.

The first communication node may receive first scheduling information indicating that a first signal is to be transmitted to the first communication node. The first communication node may identify a first frequency at which the first signal is transmitted based on the first scheduling information. The first communication node may determine a first lens applied to the first antenna for reception of the first signal, based on the reference frequency information and the first frequency.

In an exemplary embodiment of the communication system, the first indication may include reference lens information corresponding to the reference frequency information. On the other hand, in an exemplary embodiment of the communication system, the first communication node may configure reference lens information on its own. In the instant case, when identifying the reference frequency information based on the first indication, the first communication node may identify a plurality of reference frequencies included in the reference frequency information. The first communication node may identify information on a spacing between the plurality of antenna elements in the first antenna. The first communication node may configure the reference lens information including information on a plurality of lenses suitable for receiving wireless signals at the plurality of reference frequencies, based on information on a wavelength corresponding to each of the plurality of reference frequencies and the spacing between the plurality of antenna elements.

In determining the first lens, the first communication node may identify the first reference frequency corresponding to the first frequency from the reference frequency information, identify a first lens corresponding to the first reference frequency from the identified or preconfigured reference lens information, and apply the first lens to the first antenna. The first communication node may receive the first signal through the first antenna, which is refracted at the first lens and then incident on at least some of the plurality of antenna elements.

The first signal may correspond to a signal for primary sensing. The first communication node may configure a candidate antenna group based on the primary sensing. The first communication node may receive a second scheduling signal for a second signal for secondary sensing. The first communication node may receive the second signal for secondary sensing. The second signal may be the same as the first signal, may be a retransmitted signal of the first signal, or may be a separate signal from the first signal. The first communication node may identify an AoA of the wireless signal based on the secondary sensing.

According to the signal transmission and reception method in the communication system, MIMO-based communication performance for transmitting and receiving wireless signals using a large number of antennas in a high frequency band can be improved. The communication node can easily respond even when there is a large variation in a frequency used for wireless communication by variably applying a lens without changing an arrangement structure of antenna elements constituting the MIMO antenna. The communication node can easily estimate AoAs of wireless signals incident on the antenna elements of the MIMO antenna through the lens.

However, the effects that the exemplary embodiments of the signal transmission and reception methods and apparatuses can achieve in the communication system are not limited to those mentioned above. Other effects not mentioned are expected to be clearly understood by those skilled in the art in the technical field to which the present disclosure belongs, based on the configurations described in the present disclosure.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An operation method of a first communication node in a communication system, the operation method comprising:
   receiving a first indication from a second communication node in the communication system;
   based on the received first indication, identifying reference frequency information for determining a lens to be applied to a first antenna included in the first communication node and including a plurality of antenna elements;
   receiving first scheduling information indicating that a first signal is to be transmitted to the first communication node;
   based on the first scheduling information, identifying a first frequency at which the first signal is to be transmitted;
   based on the reference frequency information and the first frequency, determining a first lens applied to the first antenna for reception of the first signal; and
   receiving the first signal through the first antenna, the first signal being refracted at the first lens and then incident on at least part of the plurality of the antenna elements of the first antenna.

2. The operation method of claim 1, wherein the first indication includes reference lens information corresponding to the reference frequency information, and the determining of the first lens includes:
   identifying a first reference frequency corresponding to the first frequency from the reference frequency information;
   identifying the first lens corresponding to the first reference frequency from the reference lens information; and
   applying the first lens to the first antenna.

3. The operation method of claim 1, wherein the determining of the first lens includes:
   identifying a first reference frequency corresponding to the first frequency from the reference frequency information;
   identifying the first lens corresponding to the first reference frequency from reference lens information, the reference lens information being configured in the first communication node as corresponding to the reference frequency information; and
   applying the first lens to the first antenna.

4. The operation method of claim 3, wherein the identifying of the reference frequency information includes:
   identifying a plurality of reference frequencies included in the reference frequency information;
   identifying information on a spacing between the plurality of antenna elements of the first antenna; and
   configuring the reference lens information including information on a plurality of lenses suitable for reception of wireless signals at the plurality of reference frequencies, based on wavelengths corresponding to the respective plurality of reference frequencies and information on the spacing between the plurality of antenna elements.

5. The operation method of claim 1, wherein the receiving of the first signal includes:
   identifying information on received strengths of the first signal at the respective plurality of antenna elements through primary sensing; and
   based on the identified information on the received strengths, determining a candidate antenna group that satisfies a first condition from the plurality of antenna elements.

6. The operation method of claim 5, wherein the identifying of the information on the received strengths of the first signal includes:
   activating one or more antenna elements for each of a plurality of antenna groups each composed of a plurality of antenna elements;
   detecting a received strength of the first signal through each of one or more antenna elements activated for each of the plurality of antenna groups; and
   based on the received strengths of the first signal detected through the respective activated one or more antenna elements, estimating received strengths of the first signal at all antenna elements included in the respective plurality of antenna groups.

7. The operation method of claim 5, wherein the receiving of the first signal includes:
   determining whether to perform the primary sensing again based on a number of antenna elements included in the candidate antenna group;
   generating a re-sensing indicator indicating whether to perform the primary sensing again; and
   transmitting the re-sensing indicator to the second communication node.

8. The operation method of claim 5, wherein the determining of the candidate antenna group includes:
   comparing the received strength of the first signal at each of the plurality of antenna elements with a first threshold; and
   determining one or more antenna elements at which received strengths of the first signal are greater than or equal to the first threshold as the candidate antenna group.

9. The operation method of claim 1, further comprising:
- after receiving the first signal, identifying a candidate antenna group determined based on primary sensing on the first signal;
- performing secondary sensing on a second signal transmitted to the first communication node to identify information a received strength at each candidate antenna element included in the identified candidate antenna group;
- determining a final antenna group that satisfies a second condition from the candidate antenna elements, based on the information on the received strength at each of the candidate antenna elements;
- identifying information on an angle of arrival (AoA) at one or more antenna elements included in the final antenna group; and
- based on the identified information on the AoA, estimating an AoA of the second signal at the first antenna.

10. The operation method of claim 9, wherein the determining of the final antenna group includes:
- comparing the received strength of the second signal at each of the candidate antenna elements with a second threshold; and
- determining one or more antenna elements at which received strengths of the second signal is greater than or equal to the second threshold as the final antenna group.

11. The operation method of claim 9, wherein the estimating of the angle of arrival includes:
- in response that the final antenna group includes a plurality of antenna elements, estimating that each of AoAs at the plurality of antenna elements included in the final antenna group corresponds to an AoA of each of multiple paths through which the second signal is received.

12. An operation method of a first communication node in a communication system, the operation method comprising:
- transmitting, to a second communication node in the communication system, a first indicating including reference frequency information and reference lens information for determining a lens to be applied to a first antenna included in the second communication node and including a plurality of antenna elements;
- transmitting, to the second communication node, first scheduling information for a first signal, which is configured based on a first reference frequency among one or more reference frequencies indicated by the reference frequency information included in the first indication; and
- based on the first scheduling information, transmitting the first signal to the second communication node,
- wherein the first signal is received at the first antenna through a first lens corresponding to the first reference frequency based on the reference lens information.

13. The operation method of claim 12, further comprising: after transmitting the first indication, transmitting information on a first condition to the second communication node, wherein the first condition is used to determine a candidate antenna group from the plurality of antenna elements included in the first antenna through sensing on a wireless signal received by the second communication node.

14. The operation method of claim 13, further comprising:
- after transmitting the first signal, receiving, from the second communication node, a re-sensing indicator generated according to a candidate antenna group determined based on a result of primary sensing on the first signal and the first condition; and
- based on the re-sensing indicator, determining whether the second communication node is to perform the primary sensing again.

15. The operation method of claim 12, further comprising: after transmitting the first indication, transmitting information on a second condition to the second communication node, wherein the second condition is used to determine a final antenna group for Angle of Arrival (AoA) estimation of a wireless signal from the plurality of antenna elements included in the first antenna through sensing on the wireless signal received by the second communication node.

* * * * *